(12) United States Patent
Ito

(10) Patent No.: US 11,960,170 B2
(45) Date of Patent: Apr. 16, 2024

(54) BACKLIGHT DEVICE AND DISPLAY DEVICE

(71) Applicant: Funai Electric Co., Ltd., Osaka (JP)

(72) Inventor: Tatsuya Ito, Osaka (JP)

(73) Assignee: FUNAI ELECTRIC CO., LTD., Osaka (JP)

( * ) Notice: Subject to any disclaimer, the term of this patent is extended or adjusted under 35 U.S.C. 154(b) by 0 days.

(21) Appl. No.: 18/296,865

(22) Filed: Apr. 6, 2023

(65) Prior Publication Data
US 2023/0324737 A1    Oct. 12, 2023

(30) Foreign Application Priority Data
Apr. 8, 2022 (JP) .................................. 2022-64794

(51) Int. Cl.
G02F 1/13357    (2006.01)
G02F 1/1335     (2006.01)

(52) U.S. Cl.
CPC .. *G02F 1/133611* (2013.01); *G02F 1/133603* (2013.01); *G02F 1/133605* (2013.01); *G02F 1/133607* (2021.01)

(58) Field of Classification Search
CPC ......... G02F 1/133611; G02F 1/133607; G02F 1/133605
See application file for complete search history.

(56) References Cited

U.S. PATENT DOCUMENTS

| | | | |
|---|---|---|---|
| 8,177,408 B1 | 5/2012 | Coleman | |
| 10,295,825 B2 | 5/2019 | Irzyk | |
| 2008/0018827 A1 | 1/2008 | Yamamoto et al. | |
| 2018/0107068 A1* | 4/2018 | Sasaki | G02F 1/133603 |

FOREIGN PATENT DOCUMENTS

| | | | |
|---|---|---|---|
| JP | 2007080755 A | * | 3/2007 |
| JP | 2007080755 A | | 3/2007 |
| KR | 10-1218895 B1 | | 1/2013 |

OTHER PUBLICATIONS

The extended European search report for the corresponding European application No. 23166491.3, dated Aug. 3, 2023.

* cited by examiner

*Primary Examiner* — Karabi Guharay
(74) *Attorney, Agent, or Firm* — Global IP Counselors, LLP

(57) ABSTRACT

A backlight device comprises a plurality of point light sources, a luminance uniformity sheet, a light diffusion sheet, a plurality of lenses, and a partition wall. The luminance uniformity sheet includes transmission portions that are arranged opposite the point light sources. The light diffusion sheet is disposed on an opposite side of the luminance uniformity sheet relative to the point light sources. The lenses are disposed between the light diffusion sheet and the luminance uniformity sheet. The partition wall is disposed at least one of between the point light sources and the luminance uniformity sheet and between the luminance uniformity sheet and the lenses and is disposed between adjacent point light sources in a plan view or between adjacent lenses in the plan view.

19 Claims, 10 Drawing Sheets

BACKLIGHT DEVICE AND DISPLAY DEVICE

CROSS-REFERENCE TO RELATED APPLICATIONS

This application claims priority to Japanese Patent Application No. 2022-64794 filed in Japan on Apr. 8, 2022. The entire disclosure of Japanese Patent Application No. 2022-64794 is hereby incorporated herein by reference.

BACKGROUND

Field of the Invention

The present invention generally relates to a backlight device and a display device. More specifically, the present invention relates to a backlight device and a display device equipped with lenses.

Background Information

Conventionally, backlight devices and display devices equipped with lenses are known (see Japanese Laid-Open Patent Application Publication No. 2007-80755 (Patent Literature 1), for example).

The above-mentioned Patent Literature 1 discloses a lighting device (a backlight device) having light sources, a first optical sheet, and a second optical sheet. The first optical sheet of the lighting device has apertures through which at least the light from the light sources passes and a region that blocks the light from the light sources. The second optical sheet of the lighting device has lenses that align the direction of the light rays of the light incident through the apertures of the first optical sheet.

SUMMARY

However, the lighting device described in the above-mentioned Patent Literature 1 is considered to have a problem in that the contrast of the region corresponding to the adjacent light sources on the emission surface side of the second optical sheet is decreased due to the spreading of the light from the light sources. In addition, although not disclosed in the above-mentioned Patent Literature 1, it is desired to efficiently emit the diffused light when the diffused light is emitted from the lighting device. For these reasons, it is desired to effectively emit the diffused light while suppressing the decrease in the contrast.

One object of this disclosure is to provide a backlight device and a display device capable of effectively emitting diffused light while suppressing a decrease in contrast.

In view of the state of the known technology, a backlight device according to a first aspect of this disclosure is a backlight device that comprises a plurality of point light sources, a luminance uniformity sheet configured to uniform luminance of light from the point light sources and including transmission portions that are arranged opposite the point light sources and are configured to transmit the light from the point light sources, a light diffusion sheet disposed on an opposite side of the luminance uniformity sheet relative to the point light sources and configured to diffuse the light from the point light sources, a plurality of lenses disposed between the light diffusion sheet and the luminance uniformity sheet and configured to convert light transmitted through the transmission portions of the luminance uniformity sheet into parallel light or light that is slightly diffused over a range smaller than a range of an incident angle of the light transmitted through the transmission portions, and a partition wall disposed at least one of between the point light sources and the luminance uniformity sheet and between the luminance uniformity sheet and the lenses and disposed between adjacent point light sources in a plan view or between adjacent lenses in the plan view.

DETAILED DESCRIPTION OF EMBODIMENTS

Figure 1:
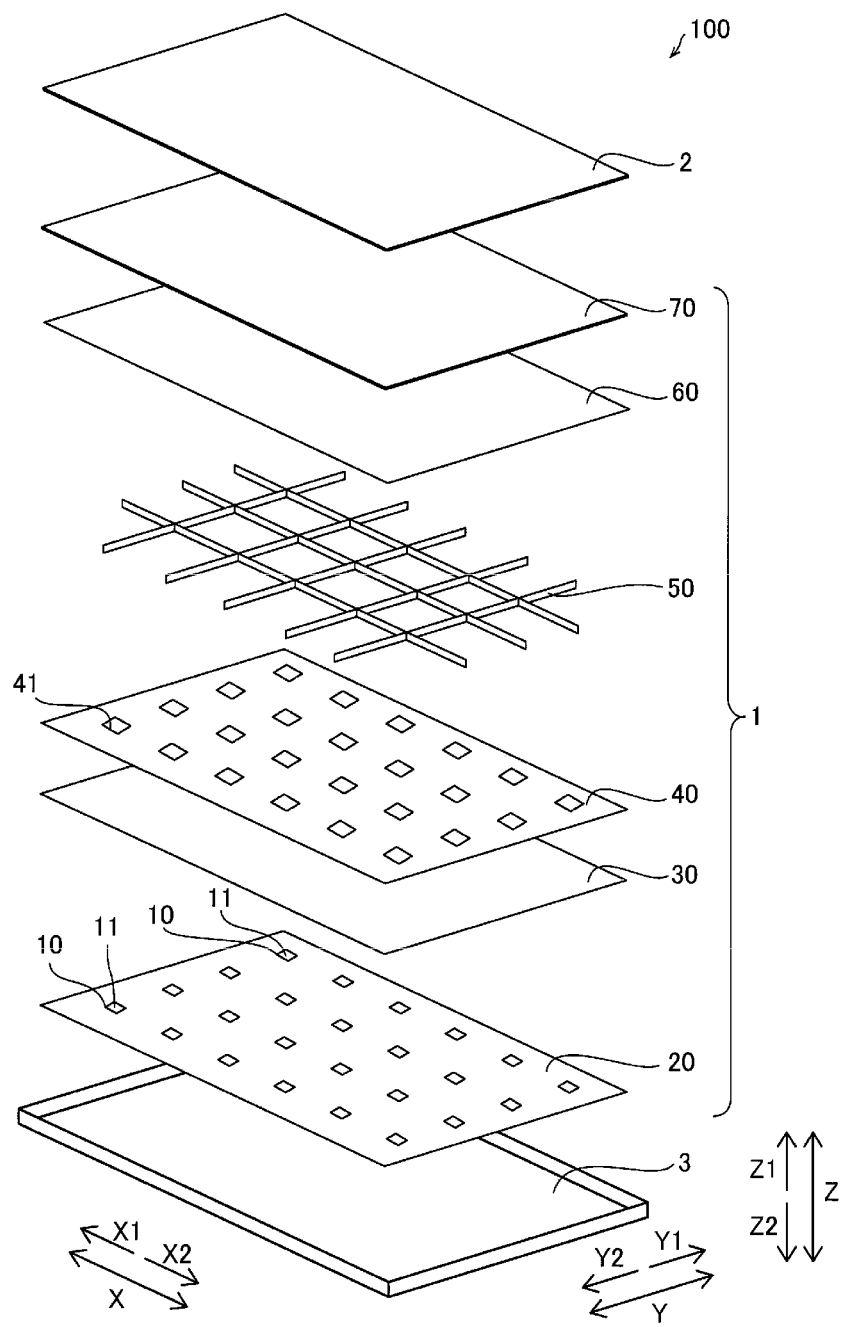
FIG. 1 is an exploded perspective view of a display device according to one embodiment.

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Configuration of Display Device 100

Referring to FIGS. 1 to 6, the configuration of a display device 100 according to one embodiment will be described. In the drawings, a left and right direction when the display device 100 is viewed from a front side is referred to as an X direction. Also, an up and down direction when the display device 100 is viewed from the front side is referred to as a Y direction. Also, a direction connecting a rear side and the front side of the display device 100 is referred to as a Z direction.

As shown in FIG. 1, the display device 100 comprises a backlight 1, a display 2, and a frame 3. The display device 100 is configured to display images. The display device 100 is, for example, a vehicle mounted display device mounted to a vehicle. The display device 100 is not limited to a vehicle mounted display device mounted to a vehicle. The backlight 1 is an example of a "backlight device" of the present disclosure.

The backlight 1 is equipped with a plurality of LED (Light Emitting Diode) light sources 10, a substrate 20, a reflective sheet 30, a luminance uniformity sheet 40, first partition walls 50, a lens sheet 60 with a plurality of lenses 61, and a light diffusion sheet 70. In the backlight 1, the LED light source 10 and the reflection sheet 30 on the substrate 20, the luminance uniformity sheet 40, the first partition walls 50, the lens sheet 60, and the light diffusion sheet 70 are arranged in this order inside the frame 3. The backlight 1 is configured to irradiate the display 2 with the light from the rear side of the display 2. The LED light sources 10 are an example of "point light sources" of the present disclosure, and the first partition walls 50 are an example of a "partition wall" of the present disclosure.

The LED light sources 10 are arranged on the substrate 20. The LED light sources 10 are arranged in a grid in the X direction and in the Y directions. In other words, the LED light sources 10 are arranged in an array or matrix. The LED light sources 10 include point light sources, respectively. The LED light sources 10 include light emitting portions 11, respectively. In this embodiment, the light emitting portions 11 of the LED light sources 10 have a substantially rectangular shape in a plan view. The luminance of the LED light sources 10 is configured to be adjusted by current value. The LED light sources 10 each are individually controllable. The LED light sources 10 are disposed on the rear side (Z2 direction side) of the display 2. Therefore, the display device 100 is a so-called direct lighting type display device. The term "point light source" means a light source whose light emitting portion has a very small area that is close to a point.

The substrate 20 is disposed on the rear side (Z2 direction side) of the reflective sheet 30. The substrate 20 is a printed circuit board. The substrate 20 has a circuit that electrically connects the LED light sources 10.

The reflective sheet 30 is disposed on the substrate 20 via an adhesive layer (not shown). The reflective sheet 30 is disposed on the LED light source 10 side with respect to the luminance uniformity sheet 40 and is arranged to surround each of the LED light sources 10. The reflective sheet 30 includes a plurality of apertures 31 (see FIG. 4) for the LED light sources 10. The reflective sheet 30 is configured to re-reflect reflected return light from a reflective portion 42 (see FIG. 3) of the luminance uniformity sheet 40 back to the luminance uniformity sheet 40 side. The reflective sheet 30 is made, for example, of foamed polyethylene terephthalate.

The luminance uniformity sheet 40 (see FIG. 5) is disposed opposite the LED light sources 10 in the Z direction. The luminance uniformity sheet 40 is disposed between the reflective sheet 30 and the lens sheet 60. The luminance uniformity sheet 40 is used to make the luminance distribution substantially uniform, thereby making the luminance substantially uniform across the entire display screen. As shown in FIG. 3, the luminance uniformity sheet 40 includes a plurality of transmission portions 41 that transmit the light emitted from the LED light sources 10 and the reflective portion 42 that reflects the light emitted from the LED light sources 10. The transmission portions 41 include through holes that penetrate in the thickness direction (the Z direction). The plurality of transmission portions 41 are provided. The reflective portion 42 is an entire portion other than portions where the through holes (i.e., the transmission portions 41) are provided (e.g., a portion of the luminance uniformity sheet other than the through holes). The reflective portion 42 is configured to reflect light incident on the reflective portion 42 toward the reflective sheet 30 side. The luminance uniformity sheet 40 is configured to make the luminance distribution in the plane direction (XY directions) substantially uniform by transmitting the light through the transmission portions 41 that are provided in advance. The luminance uniformity sheet 40 is made of a resin having a property of reflecting light. The luminance uniformity sheet 40 is made, for example, of foamed polyethylene terephthalate. A peripheral edge portion of the luminance uniformity sheet 40 is supported by spacers (not shown) provided in the frame 3. In FIG. 3, the LED light sources 10 (see FIG. 2), which are not supposed to be seen and are located at the back side of the paper, are illustrated for convenience of explanation.

In other words, the luminance uniformity sheet 40 is provided between the LED light sources 10 and the emission surface of the backlight 1. The luminance uniformity sheet 40 is formed by a sheet having reflective characteristics. The luminance uniformity sheet 40 is provided with the transmission portions 41 whose position and size are appropriately set according to the arrangement of the LED light sources 10, the light distribution of the LED light sources 10, and the structure of the frame 3 (housing). The luminance uniformity sheet 40 is an optical sheet for making the luminance on the emission surface of the backlight 1 uniform.

Figure 2:
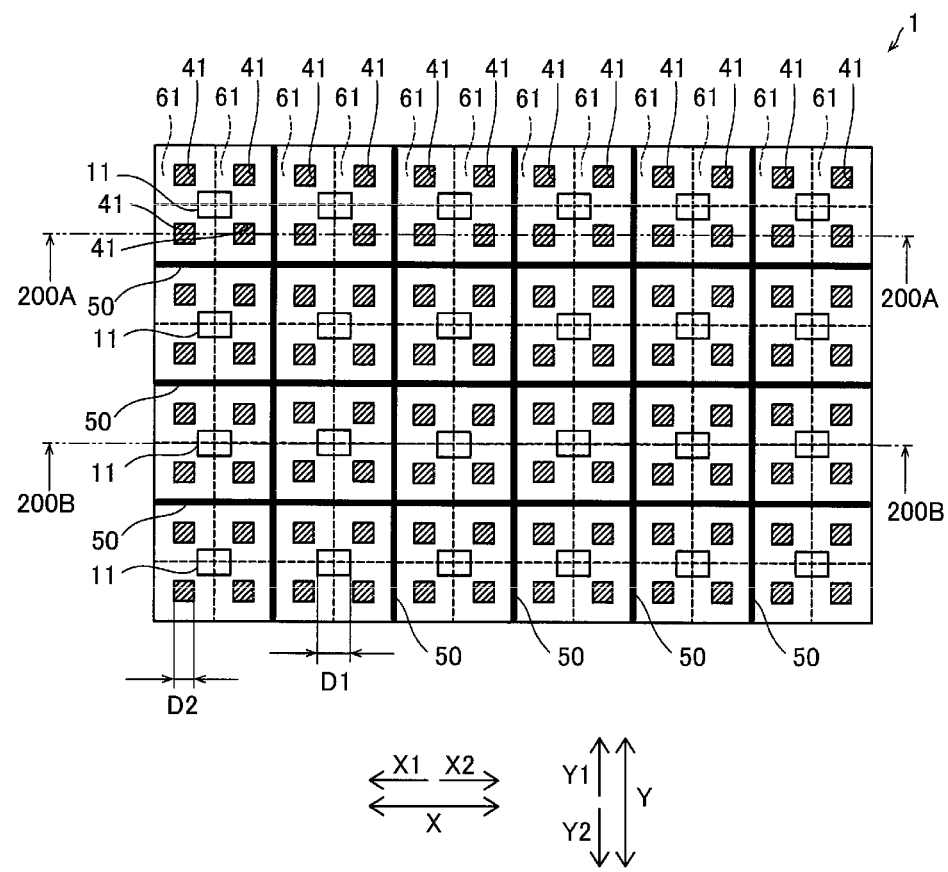
FIG. 2 is a schematic diagram showing the arrangement of light sources, transmission portions, lenses and partition walls according to the one embodiment.
Figure 3:
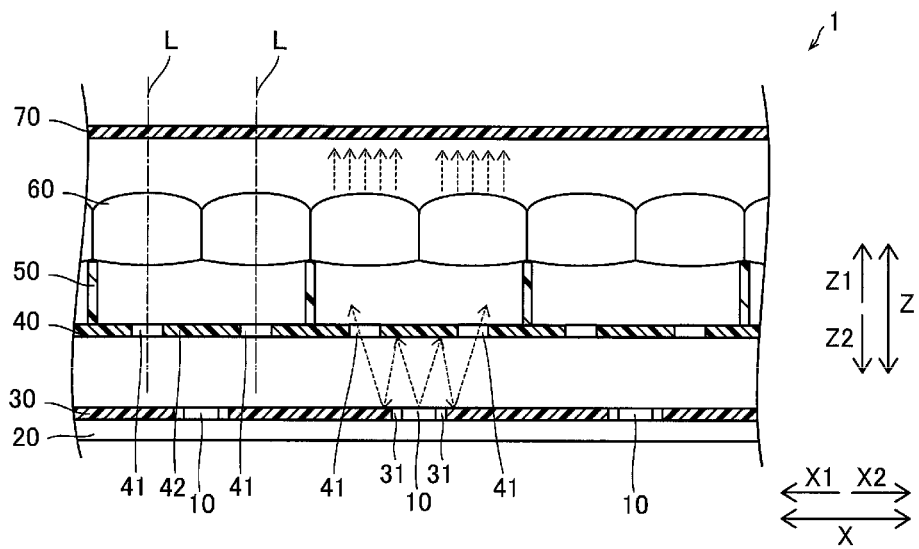
FIG. 3 is an enlarged cross-sectional view of a backlight according to the one embodiment, taken along 200A-200A line in FIG. 2.
Figure 4:
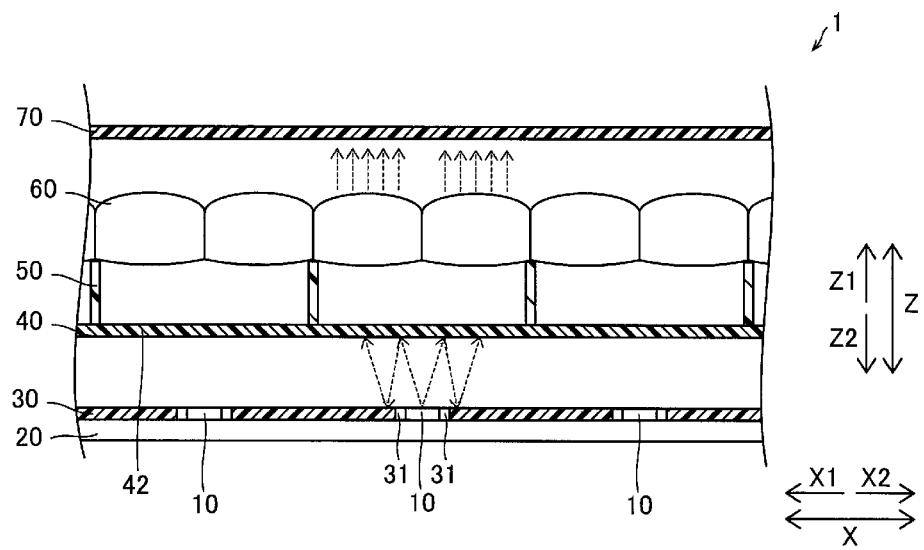
FIG. 4 is an enlarged cross-sectional view of the backlight according to the one embodiment, taken along 200B-200B line in FIG. 2.
Figure 5:
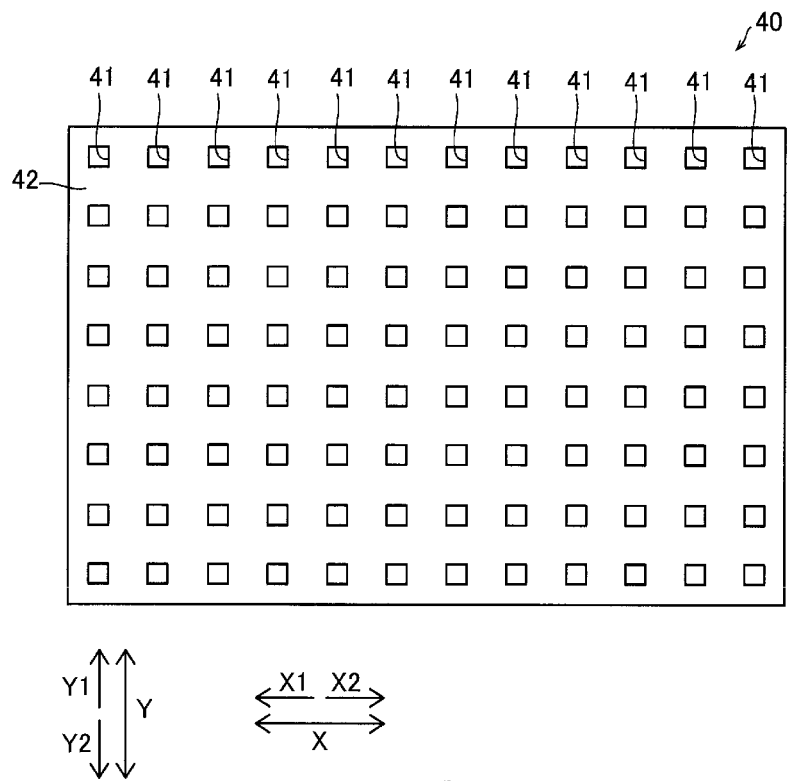
FIG. 5 is a schematic diagram of a luminance uniformity sheet of the backlight according to the one embodiment.

FIG. 2 is a schematic diagram showing the arrangement of the LED light sources 10, the transmission portions 41, the lenses 61, and the first partition walls 50 as viewed from the Z direction. In FIG. 2, the LED light sources 10 are shown by thin solid lines, the transmission portions 41 are shown by hatched lines, the first partition walls 50 are shown by thick solid lines, and the lenses 61 are shown by dashed lines. The transmission portions 41 are each offset, in the plan view, with respect to the light emitting portions 11 of the LED light sources 10 (see FIG. 1) so as not to overlap with the light emitting portions 11 of the LED light sources 10. In other words, the transmission portions 41 are each disposed with respect to the LED light sources 10 at positions that are not directly above the light emitting portions 11 in the Z direction. The transmission portions 41 are arranged in a grid along the X direction and the Y direction. The transmission portions 41 have a substantially square shape. The shape of the transmission portions 41 is similar to the shape of the lenses 61 of the lens sheet 60 in the plan view. The size D2 of each of the transmission portions 41 is smaller than the size D1 of the light emitting portions 11 of the LED light sources 10.

Figure 6:
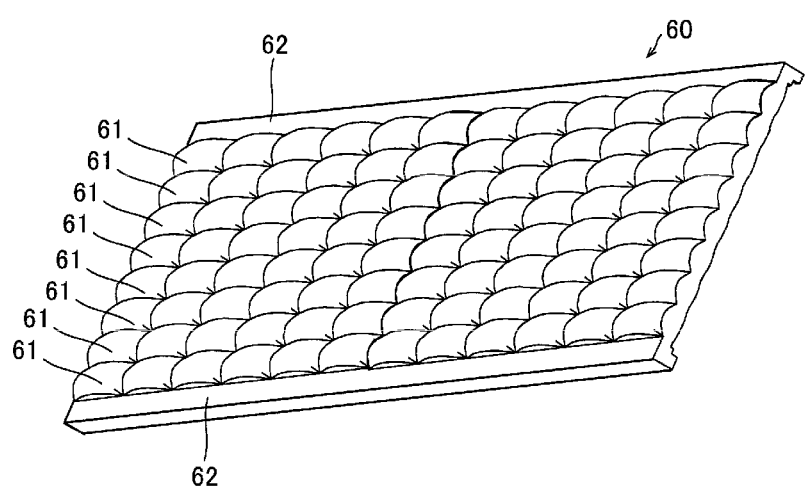
FIG. 6 is a perspective view showing a lens sheet of the backlight according to the one embodiment.

As shown in FIG. 1, the lens sheet 60 is disposed between the luminance uniformity sheet 40 and the light diffusion sheet 70. As shown in FIG. 6, the lens sheet 60 has the lenses 61. The lenses 61 are collimator lenses. As shown in FIG. 3, the lenses 61 are configured to convert light incident through the through holes of the luminance uniformity sheet 40 into parallel light parallel to the Z direction and are configured to emit the light. The light transmitted through the lenses 61 reaches the light diffusion sheet 70. By making the emission light converted into the parallel light by the lenses 61 be incident on the light diffusion sheet 70, the light can be appropriately converted into light that has a peak of diffusion in a specific direction in the light diffusion sheet 70 and whose diffusion is suppressed in directions other than the specific direction, as compared to the case in which diffused light is incident on the light diffusion sheet 70.

As shown in FIG. 6, the lenses 61 each have a convex lens formed in a square shape in the plan view. The lenses 61 have the same shape as each other. The lenses 61 are arranged with each other in the X direction and in the Y direction. As shown in FIG. 2, the lenses 61 are provided one for each of the transmission portions 41 of the luminance uniformity sheet 40. The lenses 61 are arranged in a matrix in the same manner as the arrangement of the transmission portions 41. As shown in FIG. 3, the transmission portions 41 of the luminance uniformity sheet 40 are arranged on the optical axes L of the lenses 61, respectively. The reflective portion 42 of the luminance uniformity sheet 40 is not disposed on the optical axes L of the lenses 61.

The LED light sources 10 are arranged one for at least two lenses 61 of the lenses 61. In this embodiment, as shown in FIG. 2, the LED light sources 10 are arranged one for four lenses 61 of the lenses 61. As viewed from the Z direction, the region in which the four lenses 61 are arranged has a substantially square shape. As viewed from the Z direction, the LED light sources 10 are each arranged to straddle the four lenses 61 of the lenses 61. As viewed from the Z direction, the LED light sources 10 are each disposed in a center portion of the substantially square-shaped region formed by the four lenses 61.

The lenses 61 are made of a resin that transmits light. The lenses 61 are made of a transparent resin, such as polycarbonate, acrylic resin, or polyolefin, for example. The lens sheet 60 has an area that is larger than the bottom surface inside the frame 3. Holding portions 62 (see FIG. 6) of the lens sheet 60 are supported by protrusions (not shown) provided on the inner surface of the frame 3.

As shown in FIG. 1, the light diffusion sheet 70 is disposed on the opposite side of the lens sheet 60 with respect to the luminance uniformity sheet 40. The light diffusion sheet 70 is configured to diffuse the light transmitted through the lens sheet 60. The light diffusion sheet 70 has an asymmetric fine pattern formed on the surface on the display side. The light diffusion sheet 70 is made, for example, of polyethylene terephthalate or polycarbonate.

In this embodiment, the light diffusion sheet 70 is an anisotropic light diffusion sheet that diffuses the light from LED light sources 10 anisotropically. The light diffusion sheet 70 is configured to emit light that has a peak of diffusion in a specific direction and whose diffusion is suppressed in directions other than the specific direction. The light diffusion sheet 70 is configured to have a wide diffusion angle in the X direction and a narrow diffusion angle in the Y direction with respect to the incident light from the lenses 61. For example, the light diffusion sheet 70 is configured so that the diffusion angle in the X direction is about ±50 degrees and the diffusion angle in the Y direction is about ±30 degrees. Alternatively, the light diffusion sheet 70 is configured so that, for example, the diffusion angle in the X direction is about ±50 degrees and the diffusion angle in the Y direction is about ±20 degrees. Alternatively, the light diffusion sheet 70 is configured so that, for example, the diffusion angle in the X direction is about ±50 degrees and the diffusion angle in the Y direction is about ±10 degrees. The diffusion angle in the X direction and the diffusion angle in the Y direction of the light diffusion sheet 70 are not particularly limited.

The first partition walls 50 are disposed between the luminance uniformity sheet 40 and the lens sheet 60. As shown in FIG. 2, the first partition walls 50 are formed in a grid shape partitioning compartments in the X direction and in the Y direction. The first partition walls 50 are formed to partition each compartment into a substantially rectangular shape. The first partition walls 50 are disposed between adjacent LED light sources 10 in the plan view. In other words, the first partition walls 50 divide between the LED light sources 10 so that the LED light sources 10 are each arranged in a different compartment from each other. The first partition walls 50 are each configured to be disposed along an outer periphery of a placement region of the lenses 61 corresponding to one LED light source 10 in the plan view. In this embodiment, the first partition walls 50 are each disposed along the outer periphery of the placement region of four lenses 61 corresponding to one LED light source 10 in the plan view. The display device 100 supports a local dimming, in which the luminance is controlled for each compartment partitioned by the first partition walls 50. The display device 100 adjusts the luminance of each LED light source 10 according to the color of the image. The local dimming is a technique that divides the entire screen of the display device into a plurality of regions and adjusts the luminance of the light sources for each region.

As shown in FIG. 3, one ends of the first partition walls 50 in the Z direction are in contact with the luminance uniformity sheet 40, and the other ends of the first partition walls 50 in the Z direction is in contact with the lens sheet 60. No partition wall is disposed between the reflective sheet 30 and the luminance uniformity sheet 40. With this configuration, the light from the LED light sources 10 is repeatedly reflected between the reflective portion 42 of the luminance uniformity sheet 40 and the reflective sheet 30, and thus the light from the LED light sources 10 can be effectively mixed.

The first partition walls 50 are formed of resin. The first partition walls 50 are configured to absorb the light emitted from the LED light sources 10. The first partition walls 50 preferably have lower brightness, and for example, it is made of a resin having a black color.

As shown in FIG. 1, the display 2 is arranged opposite the light diffusion sheet 70 and is disposed on an opposite side relative to the LED light sources 10. The display 2 is, for example, a liquid crystal panel. The display 2 includes a plurality of pixels. The display 2 displays an image by changing the transmittance of the light emitted from the LED light sources 10 by each of the pixels. The display 2 is driven based on image signals. The display 2 includes a liquid crystal cell.

The frame 3 has a box shape with an opening on the front side. In this embodiment, the bottom surface inside the frame 3 has a rectangular shape.

Effect of this Embodiment

The following effects can be achieved in this embodiment.

As described above, this embodiment comprises the light diffusion sheet 70, the lenses 61 that convert light into the parallel light or the light that is slightly diffused, and the first partition walls 50 disposed between the luminance uniformity sheet 40 and the lenses 61 and disposed between adjacent LED light sources 10 in the plan view. With this configuration, the decrease in contrast on the emission surface side of the lenses 61 can be suppressed because the spreading of the light from the LED light sources 10 can be suppressed by the first partition walls 50 disposed between the luminance uniformity sheet 40 and the lenses 61. In addition, since the parallel light and the slightly diffused light can be incident on the light diffusion sheet 70 from the lenses 61, the diffused light can be efficiently emitted from the light diffusion sheet 70, unlike when light that is not the parallel light or the slightly diffused light is incident on the light diffusion sheet 70. For these reasons, the diffused light can be efficiently emitted while suppressing the decrease in contrast.

With this embodiment, as described above, the transmission portions 41 of the luminance uniformity sheet 40 are offset with respect to the light emitting portions 11 of the LED light sources 10 so as not to overlap with the light emitting portions 11 in the plan view. With this configuration, unlike when the transmission portions 41 of the luminance uniformity sheet 40 are disposed directly above the light emitting portions 11 of the LED light sources 10, direct light from the LED light sources 10 can be suppressed from transmitting through the transmission portions 41, and thus chromaticity irregularities caused by chromaticity variations between individual LED light sources can be suppressed.

As described above, this embodiment further comprises the reflective sheet 30 that is disposed on the LED light source 10 side of the luminance uniformity sheet 40, is arranged to surround each of the LED light sources 10, and reflects the light emitted from the LED light sources 10, and the luminance uniformity sheet 40 further includes the reflective portion 42 that reflects the light emitted from the LED light sources 10. With this configuration, the light from the LED light sources 10 is repeatedly reflected between the reflective portion 42 of the luminance uniformity sheet 40 and the reflective sheet 30, and thus the light from the LED light sources 10 is mixed (blended). This allows the mixed light to transmit through the transmission portions 41, and thus the chromaticity irregularities caused by the chromaticity variations between individual LED light sources 10 can be further suppressed. In addition, the illuminance distribution of the light emitted from the lenses 61 can be made uniform, and the luminance can be made high due to the light collecting effect of each of the lenses 61.

With this embodiment, as described above, the lenses 61 are arranged one for each of the transmission portions 41 of the luminance uniformity sheet 40, and the LED light sources 10 are arranged one for at least two lenses 61 of the lenses 61. With this configuration, the mixed light transmitted through the transmission portions 41 can be incident on the lenses 61 arranged one for each of the transmission portions 41, and the light can be emitted from the lenses 61 in the region of one LED light source 10. As a result, the illuminance distribution of the light emitted from the lenses 61 can be made more uniform and the luminance can be made higher.

With this embodiment, as described above, the LED light sources 10 are arranged in an array, and the LED light sources 10 are each arranged to straddle the at least two lenses 61 in the plan view. With this configuration, the luminance uniformity can be further improved because the LED light source 10 can be disposed about the center portion of the region of one LED light source 10.

With this embodiment, as described above, the first partition wall 50 is disposed along the outer periphery of the placement region of the at least two lenses 61 in the plan view. With this configuration, the decrease in contrast in the region corresponding to the adjacent LED light sources 10 on the emission surface side of the lenses 61 can be more suppressed.

With this embodiment, as described above, the size D2 of the transmission portions 41 of the luminance uniformity sheet 40 is smaller than the size D1 of the light emitting portions 11 of the LED light sources 10 in the plan view. With this configuration, the size of the reflective portion 42 of the luminance uniformity sheet 40 can be made larger, compared to a case in which the size D2 of the transmission portions 41 of the luminance uniformity sheet 40 is larger than the size D1 of the light emitting portions 11 of the LED light sources 10. This allows more light from the LED light sources 10 to be repeatedly reflected between the reflective portion 42 of the luminance uniformity sheet 40 and the reflective sheet 30, and thus the light from the LED light sources 10 can be more effectively mixed. As a result, the chromaticity irregularities can be further suppressed and the luminance uniformity can be further improved.

With this embodiment, as described above, the light diffusion sheet 70 is an anisotropic light diffusion sheet that diffuses the light from the light sources anisotropically. With this configuration, the light incident on the anisotropic light diffusion sheet can be emitted as light that has a peak of diffusion in a specific direction and whose diffusion is suppressed diffusion in directions other than the specific direction. Therefore, for example, the display device 100 can be made to perform high luminance display in the specific direction.

With this embodiment, as described above, the transmission portions 41 of the luminance uniformity sheet 40 are located on the optical axes L of the lenses 61. With this configuration, it is possible to suppress an increase of light that does not pass through centers of the lenses 61 out of the light transmitted through the luminance uniformity sheet 40. Therefore, for example, blurring of the displayed image on the display device 100 can be suppressed.

MODIFICATION EXAMPLES

The embodiments disclosed here should be considered in all respects to be illustrative and not restrictive. The scope of the invention is indicated by the claims, not by the description of the embodiments described above, and furthermore includes all changes (modification examples) within the meaning and scope equivalent to the claims.

For example, in the embodiment, as described above, an example is shown in which the reflective sheet 30 is provided, the luminance uniformity sheet 40 includes the reflective portion 42, the transmission portions 41 of the luminance uniformity sheet 40 are offset with respect to the light emitting portions 11 of the LED light sources 10 so as not to overlap with the light emitting portions 11 in the plan view, the LED light sources 10 are arranged one for four lenses 61 of the lenses 61, and the first partition walls 50 are disposed between the luminance uniformity sheet 40 and the lenses 61, but the present invention is not limited to this.

Figure 7:
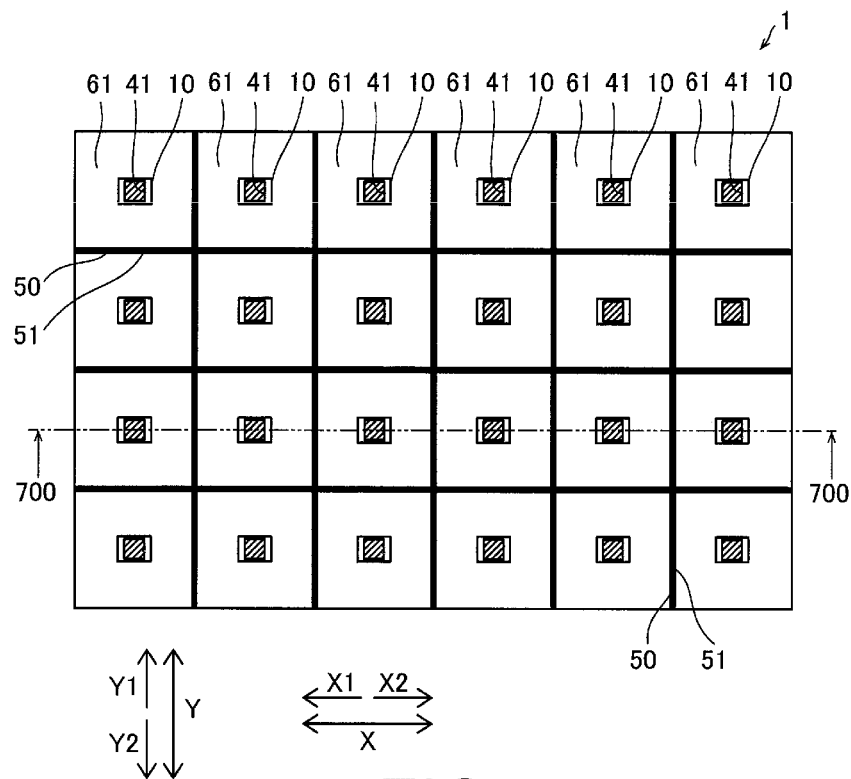
FIG. 7 is a schematic diagram showing an example 1 of the arrangement of light sources, transmission portions, lenses and partition walls according to a modification example.
Figure 8:
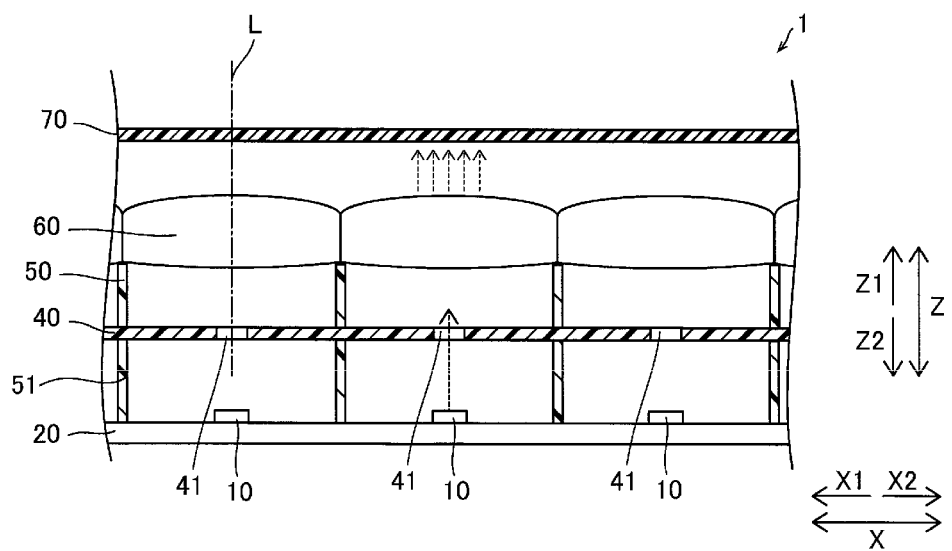
FIG. 8 is an enlarged cross-sectional view of a backlight according to the modification example, taken along 700-700 line in FIG. 8.

For example, as shown in FIGS. 7 and 8, it can be configured such that the reflective sheet 30 is not provided, the luminance uniformity sheet 40 does not include the reflective portion 42, the transmission portions 41 of the luminance uniformity sheet 40 are arranged to overlap the light emitting portions 11 of the LED light sources 10 in the plan view, the LED light sources 10 are arranged one for one lens 61 of the lenses 61, and second partition walls 51 are further provided the LED light sources 10 and the luminance uniformity sheet 40.

As shown in FIG. 8, the second partition walls 51 are disposed between the LED light sources 10 and the luminance uniformity sheet 40. One ends of the second partition walls 51 in the Z direction are in contact with the substrate 20, and the other ends of the second partition walls 51 in the Z direction are in contact with the luminance uniformity sheet 40. As shown in FIG. 7, the second partition walls 51 are arranged in the same position as the first partition walls 50 so as to overlap with the first partition walls 50 in the plan view. The first and second partition walls 50 and 51 are each disposed along the outer periphery of the placement region of one lens 61 corresponding to one LED light source 10 in the plan view. The display device 100 supports a local dimming in which the luminance is controlled for each compartment partitioned by the first and second partition walls 50 and 51. The second partition walls 51 are configured to absorb the light emitted from the LED light sources 10. Specifically, the second partition walls 51 are made of a resin having a color such as black. It can also be configured such that either one ends of the second partition walls 51 in the Z direction are in contact with the substrate 20, or the other ends of the second partition walls 51 in the Z direction are in contact with the luminance uniformity sheet 40.

Even with this configuration, the first and second partition walls 50 and 51 can suppress the spread of the light from the LED light sources 10.

In the embodiment, as described above, an example is shown in which the lenses 61 include collimator lenses, and the lenses 61 are configured to convert the light incident through the through holes of the luminance uniformity sheet 40 into the parallel light parallel to the Z direction and are configured to emit the light, but the present invention is not limited to this. For example, the lenses 61 can be configured to convert light into light that is slightly diffused over a range smaller than a range of an incident angle of the light transmitted through the transmission portions 41 of the luminance uniformity sheet 40 and incident on the lenses 61 and be configured to emit the light. In this case, for example, the lenses 61 can be configured to convert the light incident through the through holes of the luminance uniformity sheet 40 into light that diffuses about ±10 degrees in the Z direction and be configured to emit the light. Even if the lenses 61 are configured to convert light into the light that is slightly diffused and are configured to emit the light, the same effect can be obtained as when the lenses 61 are configured to convert light into the parallel light and are configured to emit the light.

In the embodiment, as described above, an example is shown in which the light diffusion sheet 70 is an anisotropic light diffusion sheet that diffuses the light from the LED light sources 10 anisotropically, but the present invention is not limited to this. For example, the light diffusion sheet 70 can be an isotropic light diffusion sheet that diffuses the light from the LED light sources 10 isotropically. In this case, for example, the light diffusion sheet 70 can be configured to convert light incident from the lenses 61 to diffuse about ±30 degrees in the Z direction and be configured to emit the light.

In the embodiment, as described above, an example is shown in which the lenses 61 each have a substantially square shape in the plan view and have the same shape as each other, and the LED light sources 10 are configured to be arranged one for four lenses 61 of the lenses 61, but the present invention is not limited to this. The LED light sources 10 can be arranged one for two, three, or five or more lenses 61 of the lenses 61.

Figure 9:
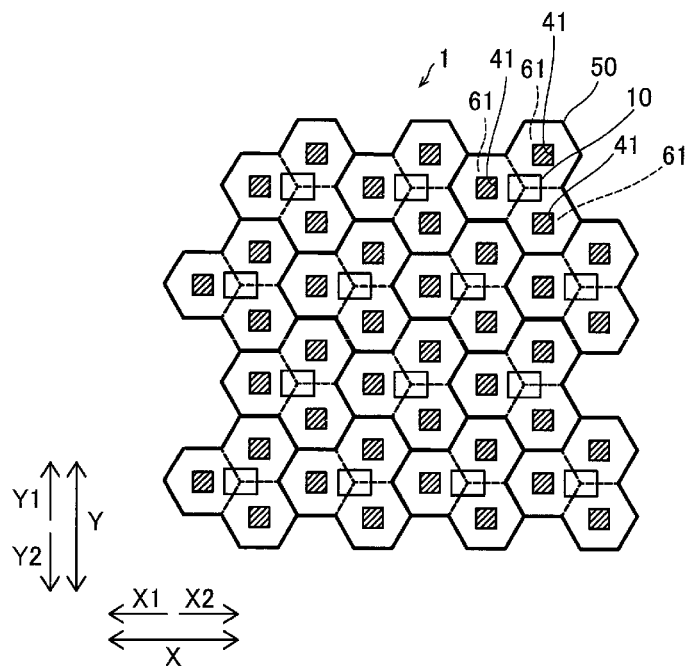
FIG. 9 is a schematic diagram showing an example 2 of the arrangement of light sources, transmission portions, lenses and partition walls according to a modification example.

For example, as shown in FIG. 9, the lenses 61 can each have a substantially hexagonal shape in the plan view and have the same shape as each other, and the LED light sources 10 can be arranged one for three lenses 61 of the lenses 61. In this case, the first partition walls 50 are each disposed along the outer periphery of the placement region of three adjacent lenses 61 corresponding to one LED light source 10 in the plan view. The shape of the transmission portions 41 of the luminance uniformity sheet 40 can be a rectangular shape or other shapes such as a substantially hexagonal shape.

Figure 10:
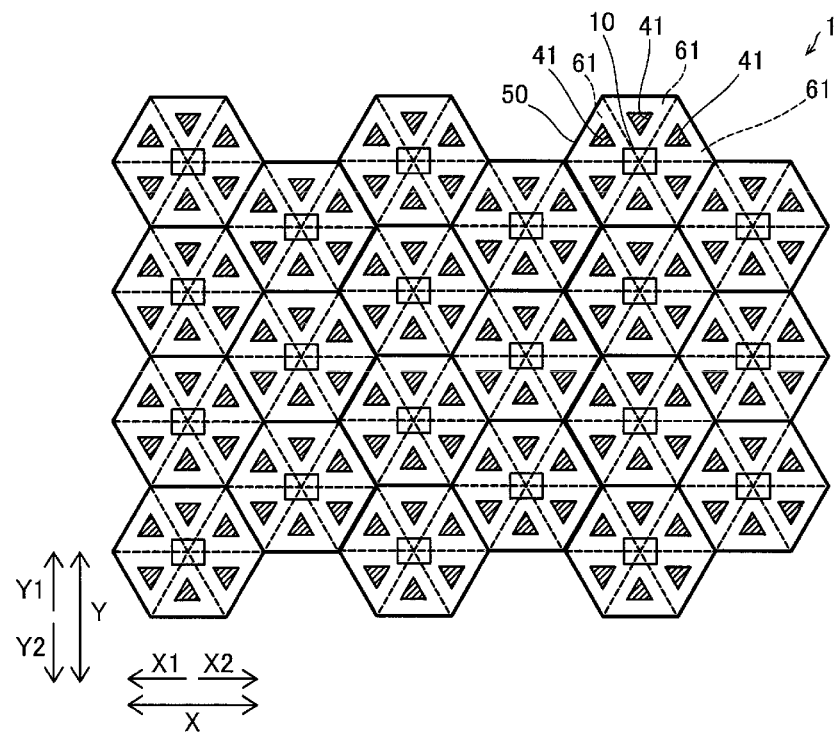
FIG. 10 is a schematic diagram showing an example 3 of the arrangement of light sources, transmission portions, lenses and partition walls according to a modification example.

As shown in FIG. 10, for example, the lenses 61 can each have a substantially triangular shape in the plan view and have the same shape as each other, and the LED light sources 10 can be arranged one for six lenses 61 of the lenses 61. In this case, the first partition walls 50 are each disposed along the outer periphery of the placement region of six adjacent lenses 61 corresponding to one LED light source 10 in the plan view. The shape of the transmission portions 41 of the luminance uniformity sheet 40 can be a triangular shape or other shapes such as a rectangular shape.

Figure 11:
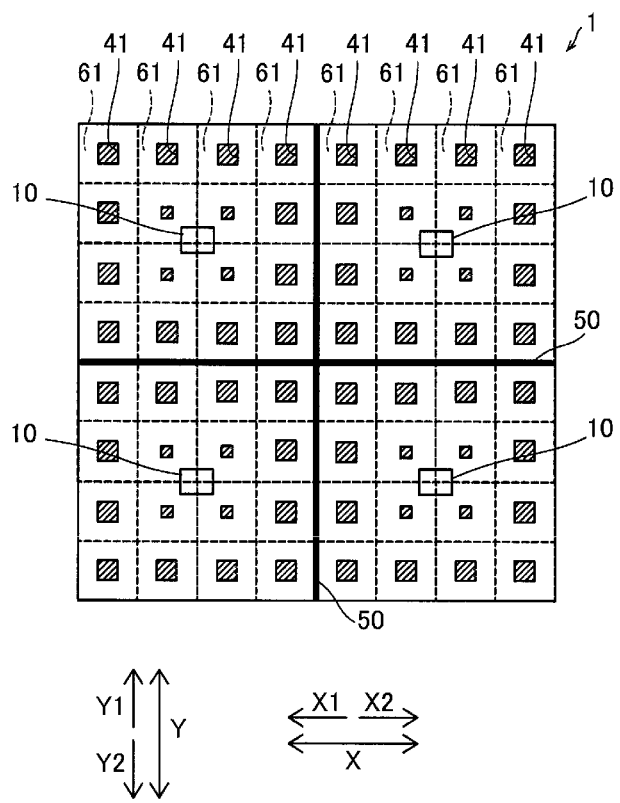
FIG. 11 is a schematic diagram showing an example 4 of the arrangement of light sources, transmission portions, lenses and partition walls according to a modification example.

As shown in FIG. 11, for example, the lenses 61 can each have a substantially square shape in the plan view and have the same shape as each other, and the LED light sources 10 can be arranged one for each of sixteen lenses 61 of the lenses 61. The size of the lenses 61 can be smaller than the size of the lenses 61 in the above embodiment. The lenses 61 in portions that do not overlap with the LED light sources 10 in the plan view can be notched to the extent that does not affect optical performance. Therefore, the lenses 61 in the portions that do not overlap with the LED light sources 10 in the plan view can be notched. With this configuration, even when the outer shape of the display device 100 is required to be different from the rectangular shape, the display device 100 can be appropriately provided in a different shape by notching some lenses 61 that do not overlap the LED light sources 10 in the plan view and are located in the periphery of the lens sheet 60. The sizes of the transmission portions 41 of the luminance uniformity sheet 40 can differ from each other according to the distance from the LED light sources 10.

In the embodiment, as described above, an example is shown in which the LED light sources 10 are arranged one for four lenses 61 of the lenses 61, and the lenses 61 each have the same shape as each other, but the present invention is not limited to this. For example, as shown in FIGS. 12 and 13, the LED light sources 10 can be arranged one for four lenses 61 of the lenses 61, and the lenses 61 can each have a different shape from each other.

Figure 12:
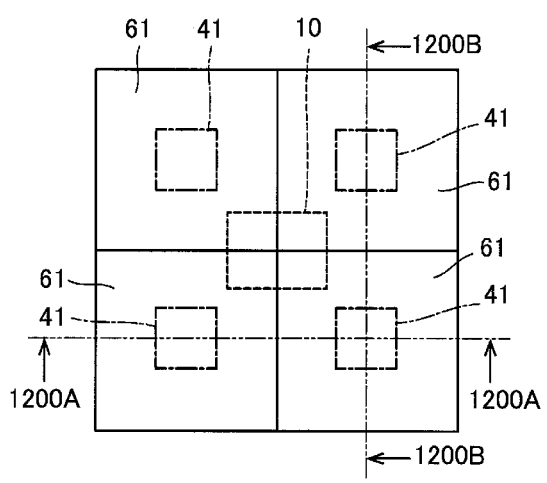
FIG. 12 is a partial schematic diagram showing a portion formed by four lenses of a plurality of lenses according to a modification example.

As shown in FIG. 12, the LED light sources 10 are arranged one for four lenses 61 of the lenses 61. The portion formed by the four lenses 61 has a substantially rectangular shape. The light amount of the light transmitted through the transmission portions 41 of the luminance uniformity sheet 40 and incident on the lenses 61 near four corners of the substantially rectangular shape formed by the four lenses 61 can be larger than in other portions, due to repeated reflection.

Figure 13:
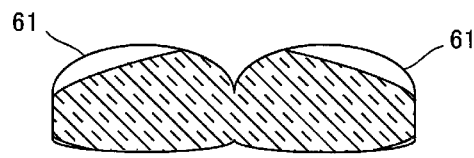
FIG. 13 is a cross-sectional schematic diagram of the four lenses of the plurality of lenses according to the modification example.

Therefore, as shown in FIG. 13, the four lenses 61 can each be configured to slope from a position closer to the center portion of the substantially rectangular shape formed by the four lenses 61 than the center portion of each of the four lenses 61 toward the rear side and toward the corners of the substantially rectangular shape formed by the four lenses 61. FIG. 13 is a cross-sectional view taken along 1200A-1200A line in FIG. 12 as well as a cross-sectional view taken along 1200B-1200B line in FIG. 12. With this configuration, the light emission can be suppressed at the four corners of the substantially rectangular shape formed by the four lenses 61, and thus uneven luminance can be suppressed. As long as the light emission can be suppressed, the four lenses 61 can each be configured to protrude further from a position closer to the center portion of the substantially rectangular shape formed by the four lenses 61 than the center portion of each of the four lenses 61 toward the front side and toward the four corners of the substantially rectangular shape formed by the four lenses 61. Furthermore, the modification example, as described above, is not limited to the portion formed by the four lenses 61 of the lenses 61. The number of lenses 61 for one LED light source 10 is not particularly limited, and the portion can be formed by six lenses 61 or the portion can be formed by sixteen lenses 61.

In the embodiment, as described above, an example is shown in which the first partition walls 50 are provided that are disposed between the luminance uniformity sheet 40 and the lens sheet 60 and made of a resin having a color such as black, but the present invention is not limited to this. The first partition walls 50 can be made of a resin having a high bright color, such as white or milky white, and reflect the light emitted from the LED light sources 10. With this configuration, the light reflected by the first partition walls 50 can be utilized, and thus the light utilization efficiency can be improved.

In the embodiment, as described above, an example is shown in which the first partition walls 50 are provided that are disposed between the luminance uniformity sheet 40 and the lens sheet 60 and made of a resin having a color such as black, but the present invention is not limited to this. For example, it can be further provided with either third partition walls 52 (see FIG. 14) or fourth partition walls 53 (see FIG. 15), which are disposed between the LED light sources 10 and the luminance uniformity sheet 40 and has a color such as white or milky white.

Figure 14:
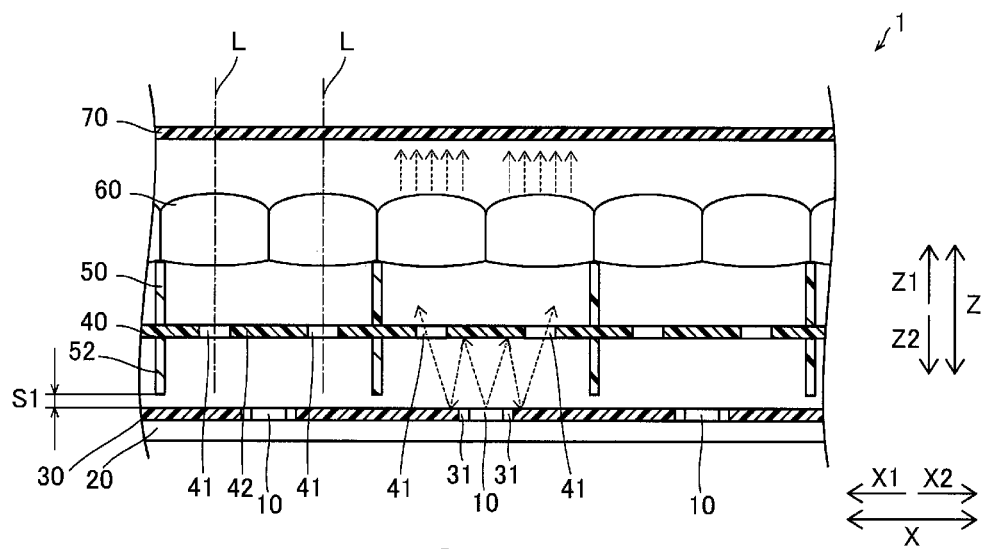
FIG. 14 is a schematic diagram showing an example 1 of partition walls according to a modification example.

As shown in FIG. 14, the third partition walls 52 are disposed between the LED light sources 10 and the luminance uniformity sheet 40. The third partition walls 52 are formed to be in contact with the luminance uniformity sheet 40 and separated (S1) from the reflective sheet 30. The third partition walls 52 are disposed in the same position as the first partition walls 50 so as to overlap the first partition walls 50 in the plan view. The first and third partition walls 50 and 52 are disposed along the outer periphery of the placement region of the lenses 61 corresponding to one LED light source 10 in the plan view. The display device 100 supports a local dimming, in which brightness is controlled for each compartment partitioned by the first and third partition walls 50 and 52. The third partition walls 52 are configured to reflect the light emitted from the LED light sources 10. Specifically, the third partition walls 52 is made of a resin having a color such as white or milky white. In FIG. 14, as in FIG. 3, the LED light source 10 (see FIG. 2), which are not supposed to be seen and are located at the back side of the paper, are also illustrated for convenience of explanation.

Figure 15:
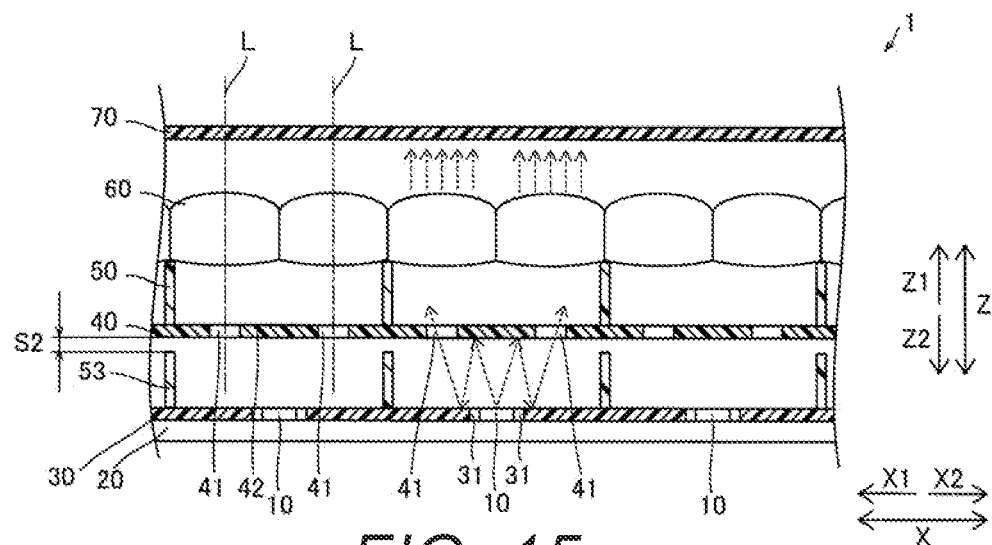
FIG. 15 is a schematic diagram showing an example 2 of partition walls according to a modification example.

As shown in FIG. 15, the fourth partition walls 53 are disposed between the LED light sources 10 and the luminance uniformity sheet 40. The fourth partition walls 53 are formed to be in contact with the reflective sheet 30 and separated (S2) from the luminance uniformity sheet 40. The fourth partition walls 53 are disposed in the same position as the first partition walls 50 so as to overlap the first partition walls 50 in the plan view. The first and fourth partition walls 50 and 53 are disposed along the outer periphery of the placement region of the lenses 61 corresponding to one LED light source 10 in the plan view. The display device 100 supports a local dimming in which the brightness is controlled for each compartment partitioned by the first and fourth partition walls 50 and 53. The fourth partition walls 53 are configured to reflect the light emitted from the LED light sources 10. Specifically, the fourth partition walls 53 are made of a resin having a color such as white or milky white. In FIG. 15, as in FIG. 3, the LED light sources 10 (see FIG. 2), which are not supposed to be seen and are located at the back side of the paper, are also illustrated for convenience of explanation.

In the modification examples further with the third partition walls 52 or the fourth partition walls 53, the third partition walls 52 or the fourth partition walls 53 are provided that are disposed between the LED light sources 10 and the luminance uniformity sheet 40, the third partition walls 52 are formed to be in contact with the luminance uniformity sheet 40 and separated (S1) from the reflective sheet 30, and the fourth partition walls 53 are formed to be in contact with the reflective sheet 30 and separated (S2) from the luminance uniformity sheet 40. With this configuration, both mixing of the light from the LED light sources 10 between the luminance uniformity sheet 40 and the reflective sheet 30 and suppression of the decrease in contrast are appropriately achieved.

In the modification examples further with the third partition walls 52 or the fourth partition walls 53, the third partition walls 52 and the fourth partition walls 53 may not be disposed in the same position as the first partition walls 50 in the plan view. For example, the third partition walls 52 and the fourth partition walls 53 can be disposed along the outer periphery of the placement region of the lenses 61 corresponding to at least two LED light sources 10 in the plan view. With this configuration, the light from the LED light sources 10 can be effectively mixed between the luminance uniformity sheet 40 and the reflective sheet 30 while suppressing the decrease in contrast.

In the embodiment, as described above, an example is shown in which the transmission portions 41 of the luminance uniformity sheet 40 are disposed on the optical axes L of the lenses 61, respectively, but the present invention is not limited to this. For example, the transmission portions 41 of the luminance uniformity sheet 40 can be disposed at positions that are offset from the optical axes L of the lenses 61.

In the embodiment, as described above, an example is shown in which the shape of the transmission portions 41 is similar to the shape of the lens 61 in the plan view, the present invention is not limited to this. For example, the shape of the transmission portions 41 does not have to be similar to the shape of the lens 61 in the plan view. For example, the shape of the transmission portions 41 can be polygonal, circular, elliptical, or the like, regardless of the shape of the lens 61 in the plan view.

In the embodiment, as described above, an example is shown in which the size D2 of each of the transmission portions 41 is smaller than the size D1 of the light emitting portions 11 of the LED light sources 10, but the present invention is not limited to this. For example, the size D2 of each of the transmission portions 41 can be the same as the size D1 of the light emitting portions 11 of the LED light sources 10, or the size D2 of each of the transmission portions 41 can be larger than the size D1 of the light emitting portions 11 of the LED light sources 10.

In the embodiment, as described above, an example is shown in which the transmission portions 41 include the through holes, but the present invention is not limited to this. For example, the transmission portions 41 can include a member with high transmittance, such as a transparent member.

In the embodiment, as described above, an example is shown in which the display 2 is disposed opposite the light diffusion sheet 70, but the present invention is not limited to this. For example, a direction changing sheet (not shown), which has a prism shape with a saw-tooth cross-sectional shape and is used to change the viewing angle, can be further provided between the display 2 and the light diffusion sheet 70. The direction changing sheet refers to a sheet that changes the direction of incident light and transmits it. Furthermore, a viewing angle limiting film (not shown) can be further provided between the display 2 and the direction changing sheet. The viewing angle limiting film refers to a film that narrows the light distribution of the light emitted from the direction changing sheet in one direction.

In the embodiment, as described above, an example is shown in which the first partition walls 50 are provided that are disposed between adjacent LED light sources 10 in the plan view, but the present invention is not limited to this. For example, as shown in FIGS. 16 to 18, it can be provided with fifth partition walls 54 disposed between adjacent lenses 61 in the plan view.

Figure 16:
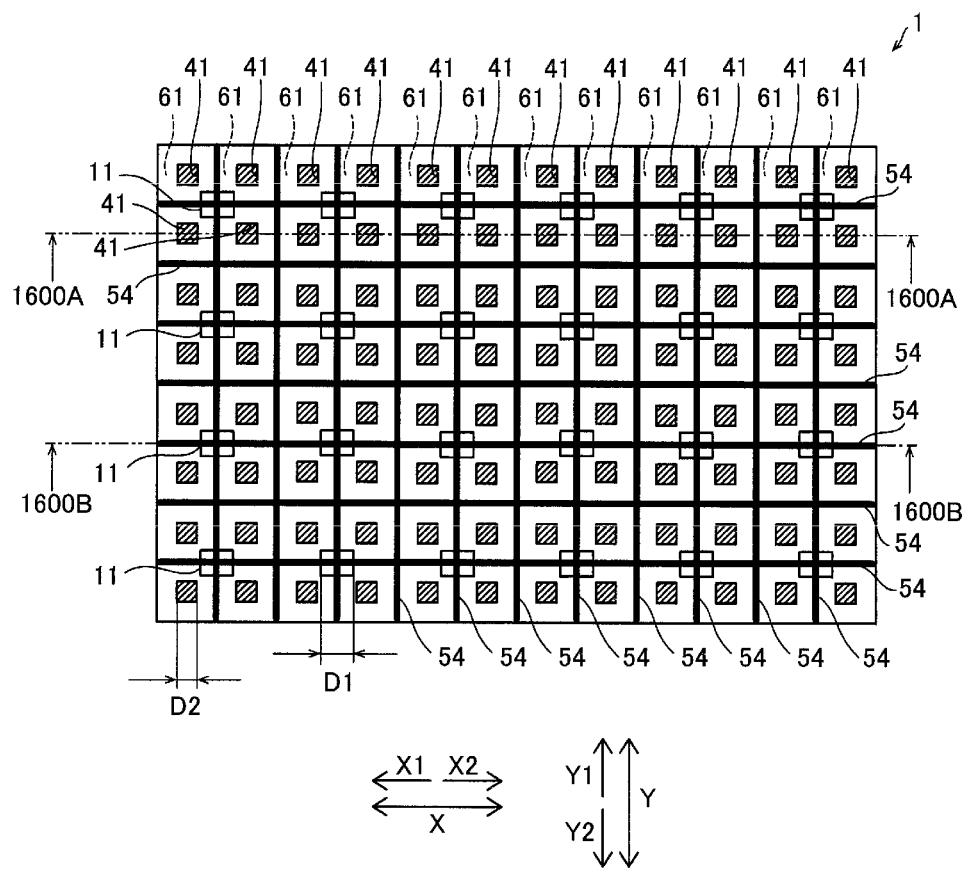
FIG. 16 is a schematic diagram showing an example 5 of the arrangement of light sources, transmission portions, lenses and partition walls according to a modification example.

FIG. 16 is a schematic diagram showing the arrangement of the LED light sources 10, the transmission portions 41, the lenses 61, and the fifth partition walls 54 as viewed from the Z direction. In FIG. 16, the LED light sources 10 are shown by thin solid lines, the transmission portions 41 are shown by hatching, and the fifth partition walls 54 are shown by thick solid lines. The fifth partition walls 54 are disposed between adjacent lenses 61 in the plan view. In other words, the fifth partition walls 54 partition the lenses 61 so that the lenses 61 are placed in different compartments from each other in the plan view.

Figure 17:
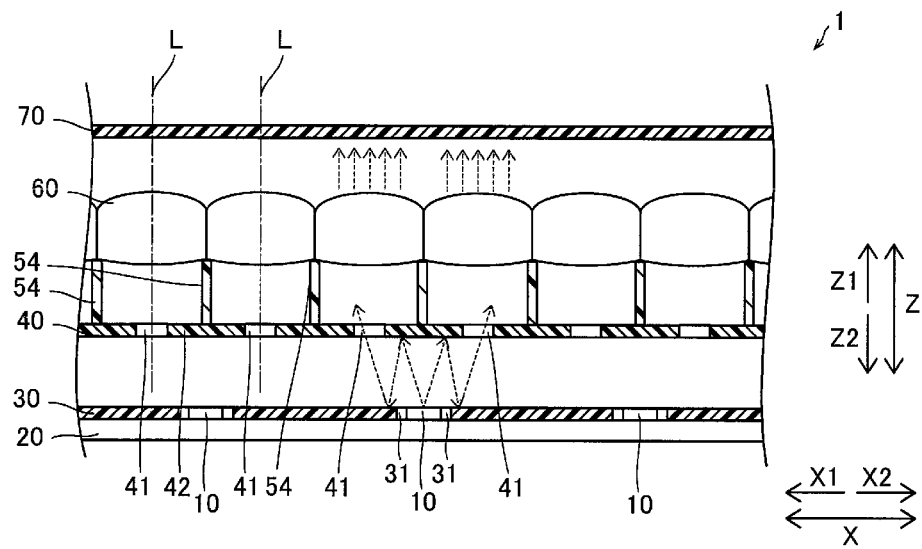
FIG. 17 is an enlarged cross-sectional view of a backlight according to the modification example, taken along 1600A-1600A line in FIG. 16.
Figure 18:
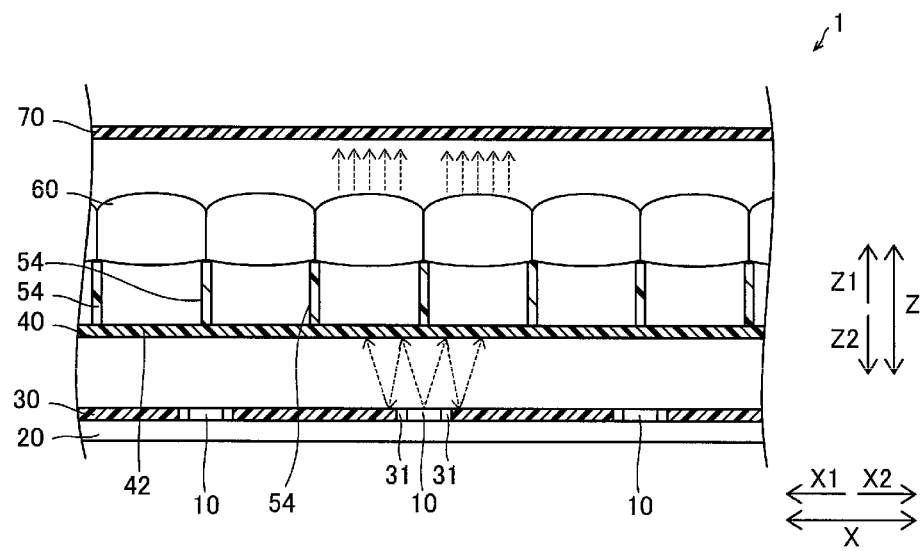
FIG. 18 is an enlarged cross-sectional view of the backlight according to the modification example, taken along 1600B-1600B line in FIG. 16.

As shown in FIGS. 17 and 18, one ends of the fifth partition walls 54 in the Z direction are in contact with the luminance uniformity sheet 40, and the other ends of the fifth partition walls 54 in the Z direction are in contact with the lens sheet 60. No partition wall is disposed between the reflective sheet 30 and the luminance uniformity sheet 40. The fifth partition walls 54 is formed of resin. The fifth partition walls 54 are configured to absorb the light emitted from the LED light sources 10. The fifth partition walls 54 can be configured to reflect the light emitted from the LED light sources 10. In FIG. 17, as in FIG. 3, the LED light sources 10 (see FIG. 16), which are not supposed to be seen and are located at the back side of the paper, are also illustrated for convenience of explanation.

The modification example, as described above, comprises the light diffusion sheet 70, the lenses 61 that convert light into the parallel light or the slightly diffused light, and the fifth partition walls 54 that are disposed between the luminance uniformity sheet 40 and the lenses 61 and between adjacent lenses 61 in the plan view. With this configuration, the fifth partition walls 54 that are disposed between the luminance uniformity sheet 40 and the lenses 61 can suppress the spreading of the light from the LED light sources 10, and thus the decrease in contrast on the emission surface side of the lenses 61 can be suppressed. In addition, since the parallel light and the slightly diffused light can be incident from the lenses 61 on the light diffusion sheet 70, the diffused light can be efficiently emitted from the light diffusion sheet 70, unlike when light that is not the parallel light or the slightly diffused light is incident on the light diffusion sheet 70. For these reasons, the diffused light can be efficiently emitted while suppressing the decrease in contrast.

(1) In view of the state of the known technology, a backlight device according to a first aspect of this disclosure is a backlight device that comprises a plurality of point light sources, a luminance uniformity sheet configured to uniform luminance of light from the point light sources and including transmission portions that are arranged opposite the point light sources and are configured to transmit the light from the point light sources, a light diffusion sheet disposed on an opposite side of the luminance uniformity sheet relative to the point light sources and configured to diffuse the light from the point light sources, a plurality of lenses disposed between the light diffusion sheet and the luminance uniformity sheet and configured to convert light transmitted through the transmission portions of the luminance uniformity sheet into parallel light or light that is slightly diffused over a range smaller than a range of an incident angle of the light transmitted through the transmission portions, and a partition wall disposed at least one of between the point light sources and the luminance uniformity sheet and between the luminance uniformity sheet and the lenses and disposed between adjacent point light sources in a plan view or between adjacent lenses in the plan view.

The backlight device according to the first aspect of this disclosure, as described above, comprises the light diffusion sheet, the lenses configured to convert the light into the parallel light or the light that is slightly diffused, and the partition wall disposed at least one of between the point light sources and the luminance uniformity sheet and between the luminance uniformity sheet and the lenses and disposed between adjacent point light sources in the plan view or between adjacent lenses in the plan view. With this configuration, a decrease in contrast on an emission surface side of the lenses can be suppressed because the spreading of the light from the point light sources can be suppressed by the partition wall disposed at least one of between the point light sources and the luminance uniformity sheet and between the luminance uniformity sheet and the lenses. In addition, since the parallel light and the slightly diffused light can be incident on the light diffusion sheet from the lenses, the diffused light can be efficiently emitted from the light diffusion sheet, unlike when light that is not the parallel light or the slightly diffused light is incident on the light diffusion sheet. For these reasons, the diffused light can be efficiently emitted while suppressing the decrease in contrast.

(2) In accordance with a preferred embodiment according to the backlight device mentioned above, the transmission portions of the luminance uniformity sheet are offset with respect to light emitting portions of the point light sources so as not to overlap with the light emitting portions in the plan view. With this configuration, unlike when the transmission portions of the luminance uniformity sheet are disposed directly above the light emitting portions of the point light sources, direct light from the point light sources can be suppressed from transmitting through the transmission portions, and thus chromaticity irregularities caused by chromaticity variations between individual point light sources can be suppressed.

(3) In accordance with a preferred embodiment according to any one of the backlight devices mentioned above, the size of the transmission portions of the luminance uniformity sheet is smaller than the size of the light emitting portions of the point light sources in the plan view. With this configuration, the size of the reflective portion of the luminance uniformity sheet can be made larger, compared to a case in which the size of the transmission portions of the luminance uniformity sheet is larger than the size of the light emitting portions of the point light sources. This allows more light from the point light sources to be repeatedly reflected between the reflective portion of the luminance uniformity sheet and the reflective sheet, and thus the light from the point light sources can be more effectively mixed. As a result, chromaticity irregularities can be further suppressed and luminance uniformity can be further improved.

(4) In accordance with a preferred embodiment according to any one of the backlight devices mentioned above, the lenses are arranged one for each of the transmission portions of the luminance uniformity sheet, and the point light sources are arranged one for at least two lenses of the lenses. With this configuration, the mixed light transmitted through the transmission portions can be incident on the lenses arranged one for each of the transmission portions, and the light can be emitted from the lenses in a region of one point light source. As a result, the illuminance distribution of the light from the lenses can be made more uniform and the luminance can be made higher.

(5) In accordance with a preferred embodiment according to any one of the backlight devices mentioned above, the point light sources are arranged in an array, and the point light sources are each arranged to straddle the at least two lenses of the lenses in the plan view. With this configuration, the luminance uniformity can be further improved because the point light source can be disposed about a center portion of the region of one point light source.

(6) In accordance with a preferred embodiment according to any one of the backlight devices mentioned above, the partition wall is disposed along an outer periphery of a placement region of the at least two lenses of the lenses. With this configuration, the decrease in contrast in the region corresponding to adjacent point light sources on an emission surface side of the lenses can be more suppressed.

(7) In accordance with a preferred embodiment according to any one of the backlight devices mentioned above, the light diffusion sheet is an anisotropic light diffusion sheet that is configured to diffuse the light from the point light sources anisotropically. Here, "anisotropic" means that the physical quantity or physical property changes depending on the direction. With this configuration, the parallel light or the slightly diffused light incident on the anisotropic light diffusion sheet can be emitted as light that has a peak of diffusion in a specific direction and whose diffusion is suppressed in directions other than the specific direction. Therefore, for example, a display device can be made to perform high luminance display in the specific direction.

(8) In accordance with a preferred embodiment according to any one of the backlight devices mentioned above, the backlight device further comprises a reflective sheet disposed on a point light source side of the luminance uniformity sheet, arranged to surround each of the point light sources, and configured to reflect the light from the point light sources, the luminance uniformity sheet further including a reflective portion that is configured to reflect the light from the point light sources. With this configuration, the light from the point light sources is repeatedly reflected between the reflective portion of the luminance uniformity sheet and the reflective sheet, and thus the light from the point light sources is mixed (blended). This allows the mixed light to transmit through the transmission portions, and thus the chromaticity irregularities caused by the chromaticity variations between individual point light sources can be suppressed. In addition, the illuminance distribution of the light from the lenses can be made uniform, and the luminance can be made high due to the light collecting effect of each of the lenses.

(9) In accordance with a preferred embodiment according to any one of the backlight devices mentioned above, the partition wall is disposed between the point light sources and the luminance uniformity sheet, and the partition wall is either formed in contact with the luminance uniformity sheet and separated from the reflective sheet, or formed in contact with the reflective sheet and separated from the luminance uniformity sheet. With this configuration, mixing of the light from the point light sources between the luminance uniformity sheet and the reflective sheet and suppression of the decrease in contrast can be appropriately balanced.

(10) In accordance with a preferred embodiment according to any one of the backlight devices mentioned above, the transmission portions of the luminance uniformity sheet are located on optical axes of the lenses. With this configuration, it is possible to suppress an increase of light that does not pass through centers of the lenses out of the light transmitted through the luminance uniformity sheet. Therefore, for example, blurring of displayed images on a display device can be suppressed.

(11) In accordance with a preferred embodiment according to any one of the backlight devices mentioned above, the transmission portions include through holes, respectively.

(12) In accordance with a preferred embodiment according to any one of the backlight devices mentioned above, the luminance uniformity sheet further includes a reflective portion that is a portion of the luminance uniformity sheet other than the through holes.

(13) In accordance with a preferred embodiment according to any one of the backlight devices mentioned above, the partition wall is disposed along an outer periphery of a placement region of one or more lenses of the lenses arranged corresponding to one point light source.

(14) In accordance with a preferred embodiment according to any one of the backlight devices mentioned above, the lenses have a triangular shape, a rectangular shape or a hexagonal shape.

(15) In view of the state of the known technology, a display device according to a second aspect of this disclosure is a display device that comprises any one of the backlight devices mentioned above, and a display arranged opposite the light diffusion sheet and disposed on an opposite side relative to the point light sources.

The display device according to the second aspect of this disclosure, as described above, comprises the light diffusion sheet, the lenses configured to convert the light into the parallel light or the light that is slightly diffused, and the partition wall disposed at least one of between the point light sources and the luminance uniformity sheet and between the luminance uniformity sheet and the lenses and disposed between adjacent point light sources in the plan view or between adjacent lenses in the plan view. With this configuration, a decrease in contrast on an emission surface side of the lenses can be suppressed because the spreading of the light from the point light sources can be suppressed by the partition wall disposed at least one of between the point light sources and the luminance uniformity sheet and between the luminance uniformity sheet and the lenses. In addition, since the parallel light and the slightly diffused light can be incident on the light diffusion sheet from the lenses, the diffused light can be efficiently emitted from the light diffusion sheet, unlike when light that is not the parallel light or the slightly diffused light is incident on the light diffusion sheet. For these reasons, the diffused light can be efficiently emitted while suppressing the decrease in contrast.

(16) In accordance with a preferred embodiment according to any one of the backlight devices mentioned above, the partition wall is disposed between the luminance uniformity sheet and the lenses such that the partition wall is formed in contact with the luminance uniformity sheet and the lenses.

(17) In accordance with a preferred embodiment according to any one of the backlight devices mentioned above, the backlight device further comprises an additional partition wall disposed between the point light sources and the luminance uniformity sheet.

(18) In accordance with a preferred embodiment according to any one of the backlight devices mentioned above, the additional partition wall is arranged to overlap the partition wall as viewed in the plan view.

(19) In accordance with a preferred embodiment according to any one of the backlight devices mentioned above, the backlight device further comprises a substrate on which the point light sources are mounted, the additional partition wall being formed in contact with the luminance uniformity sheet and the substrate.

(20) In accordance with a preferred embodiment according to any one of the backlight devices mentioned above, the backlight device further comprises a reflective sheet disposed on a point light source side of the luminance uniformity sheet, arranged to surround each of the point light sources, and configured to reflect the light from the point light sources, the additional partition wall being either formed in contact with the luminance uniformity sheet and separated from the reflective sheet, or formed in contact with the reflective sheet and separated from the luminance uniformity sheet.

According to the present disclosure, as described above, it is possible to provide a backlight device and a display device that can effectively emit diffused light while suppressing a decrease in contrast.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein, the following directional terms "forward", "rearward", "front", "rear", "up", "down", "above", "below", "upward", "downward", "top", "bottom", "side", "vertical", "horizontal", "perpendicular" and "transverse" as well as any other similar directional terms refer to those directions of a display device in an upright position on a horizontal surface. Accordingly, these directional terms, as utilized to describe the display device should be interpreted relative to a display device on a horizontal surface. The terms "left" and "right" are used to indicate the "right" when referencing from the right side as viewed from the front side of the display device, and the "left" when referencing from the left side as viewed from the front side of the display device.

The phrase "at least one of" as used in this disclosure means "one or more" of a desired choice. For one example, the phrase "at least one of" as used in this disclosure means "only one single choice" or "both of two choices" if the number of its choices is two. For another example, the phrase "at least one of" as used in this disclosure means "only one single choice" or "any combination of equal to or more than two choices" if the number of its choices is equal to or more than three. Also, the term "and/or" as used in this disclosure means "either one or both of".

The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:
1. A backlight device comprising:
a plurality of point light sources;
a luminance uniformity sheet configured to uniform luminance of light from the point light sources and including transmission portions that are arranged opposite the point light sources and are configured to transmit the light from the point light sources;

a light diffusion sheet disposed on an opposite side of the luminance uniformity sheet relative to the point light sources and configured to diffuse the light from the point light sources;

a plurality of lenses disposed between the light diffusion sheet and the luminance uniformity sheet and configured to convert light transmitted through the transmission portions of the luminance uniformity sheet into parallel light or light that is slightly diffused over a range smaller than a range of an incident angle of the light transmitted through the transmission portions; and a partition wall disposed between the luminance uniformity sheet and the lenses and between the luminance uniformity sheet and the light diffusion sheet, the partition wall being further disposed between adjacent point light sources in a plan view or between adjacent lenses in the plan view.

2. The backlight device according to claim 1, wherein the transmission portions of the luminance uniformity sheet are offset with respect to light emitting portions of the point light sources so as not to overlap with the light emitting portions in the plan view.

3. The backlight device according to claim 1, wherein the size of the transmission portions of the luminance uniformity sheet is smaller than the size of the light emitting portions of the point light sources in the plan view.

4. The backlight device according to claim 1, wherein the lenses are arranged one for each of the transmission portions of the luminance uniformity sheet, and the point light sources are arranged one for at least two lenses of the lenses.

5. The backlight device according to claim 4, wherein the point light sources are arranged in an array, and the point light sources are each arranged to straddle the at least two lenses of the lenses in the plan view.

6. The backlight device according to claim 4, wherein the partition wall is disposed along an outer periphery of a placement region of the at least two lenses of the lenses.

7. The backlight device according to claim 1, wherein the light diffusion sheet is an anisotropic light diffusion sheet that is configured to diffuse the light from the point light sources anisotropically.

8. The backlight device according to claim 1, further comprising a reflective sheet disposed on a point light source side of the luminance uniformity sheet, arranged to surround each of the point light sources, and configured to reflect the light from the point light sources, the luminance uniformity sheet further including a reflective portion that is configured to reflect the light from the point light sources.

9. The backlight device according to claim 1, wherein the transmission portions of the luminance uniformity sheet are located on optical axes of the lenses.

10. The backlight device according to claim 1, wherein the transmission portions include through holes, respectively.

11. The backlight device according to claim 10, wherein the luminance uniformity sheet further includes a reflective portion that is a portion of the luminance uniformity sheet other than the through holes.

12. The backlight device according to claim 1, wherein the partition wall is disposed along an outer periphery of a placement region of one or more lenses of the lenses arranged corresponding to one point light source.

13. The backlight device according to claim 1, wherein the lenses have a triangular shape, a rectangular shape or a hexagonal shape.

14. A display device comprising:

the backlight device according to claim 1; and a display arranged opposite the light diffusion sheet and disposed on an opposite side relative to the point light sources.

15. The backlight device according to claim 1, wherein the partition wall is disposed between the luminance uniformity sheet and the lenses such that the partition wall is formed in contact with the luminance uniformity sheet and the lenses.

16. The backlight device according to claim 15, further comprising an additional partition wall disposed between the point light sources and the luminance uniformity sheet.

17. The backlight device according to claim 16, wherein the additional partition wall is arranged to overlap the partition wall as viewed in the plan view.

18. The backlight device according to claim 16, further comprising a substrate on which the point light sources are mounted, the additional partition wall being formed in contact with the luminance uniformity sheet and the substrate.

19. The backlight device according to claim 16, further comprising a reflective sheet disposed on a point light source side of the luminance uniformity sheet, arranged to surround each of the point light sources, and configured to reflect the light from the point light sources, the additional partition wall being either formed in contact with the luminance uniformity sheet and separated from the reflective sheet, or formed in contact with the reflective sheet and separated from the luminance uniformity sheet.

* * * * *